(12) United States Patent
Mizukoshi et al.

(10) Patent No.: US 7,172,162 B2
(45) Date of Patent: Feb. 6, 2007

(54) CLAMP DEVICE FOR PIPE OR SIMILAR COMPONENT

(75) Inventors: Suguru Mizukoshi, Utsunomiya (JP);
Tomio Shibuya, Utsunomiya (JP);
Yasuo Tanaka, Utsunomiya (JP);
Shunya Jinnai, Utsunomiya (JP);
Masato Kanbe, Utsunomiya (JP)

(73) Assignees: Newfrey LLC, Newark, DE (US);
Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/126,317

(22) Filed: May 11, 2005

(65) Prior Publication Data

US 2005/0253033 A1 Nov. 17, 2005

(30) Foreign Application Priority Data

May 12, 2004 (JP) ............................. 2004-141927

(51) Int. Cl.
*F16L 3/22* (2006.01)
(52) U.S. Cl. .................... 248/68.1; 248/49; 248/58; 248/62; 248/65; 248/74.1; 248/74.2; 248/74.3; 248/74.4
(58) Field of Classification Search ......... 248/221.12, 248/68.1, 49, 58, 62, 65, 74.1, 74.2, 74.3, 248/74.4; 24/336
See application file for complete search history.

(56) References Cited

U.S. PATENT DOCUMENTS

| | | | |
|---|---|---|---|
| 4,669,156 A * | 6/1987 | Guido et al. ................ | 24/336 |
| 4,840,333 A * | 6/1989 | Nakayama ................ | 248/68.1 |
| 5,184,794 A * | 2/1993 | Saito ........................ | 248/68.1 |
| 5,263,671 A * | 11/1993 | Baum ........................ | 248/68.1 |
| 5,669,590 A * | 9/1997 | Przewodek ................ | 248/68.1 |
| 5,820,048 A * | 10/1998 | Shereyk et al. ............ | 248/68.1 |
| 6,089,513 A * | 7/2000 | Cau et al. .................. | 248/68.1 |
| 6,561,466 B1 * | 5/2003 | Myers et al. .............. | 248/74.4 |

FOREIGN PATENT DOCUMENTS

| | | |
|---|---|---|
| DE | 102 12 484 | 10/2003 |
| JP | 56-56976 | 5/1981 |
| JP | 5-63086 | 8/1993 |
| JP | 6-53879 | 7/1994 |
| JP | 8-326843 | 12/1996 |

* cited by examiner

*Primary Examiner*—Carl D. Friedman
*Assistant Examiner*—Todd M. Epps
(74) *Attorney, Agent, or Firm*—Miles & Stockbridge P.C.

(57) ABSTRACT

A clamp device for mounting elongated components such as pipes on a support such as a car body comprises a first clamp to be mounted on the support and a second clamp to be mounted in a recess in the first clamp. The clamp device is constructed to permit limited transverse movement of the second clamp in the recess, to accommodate bending or curving of elongated components held by the second clamp. The first clamp may also hold elongated components.

4 Claims, 8 Drawing Sheets

CLAMP DEVICE FOR PIPE OR SIMILAR COMPONENT

CROSS-REFERENCE TO RELATED APPLICATION

This application claims the benefit of Japanese Patent Application No. 2004-141927 filed May 12, 2004, incorporated herein by reference.

BACKGROUND OF THE INVENTION

The present invention relates to a clamp device for fastening long components such as heater pipes to a support such as the underfloor of an automobile.

Clamp devices for mounting long components, such as heater pipes, brake fluid pipes and fuel pipes, to supports, such as the underfloor in an automobile, are well known. Such elongated components may have a specific length that conforms to a specific mounting location. However, some tolerance is usually allowed within a certain range. If the long components are beyond the allowed tolerance, they can be bent to curve between two mounting positions, but they must be properly mounted even when bent and curved in places.

A clamp is disclosed in Unexamined Utility Model Application Publication No. 56-056976 (Patent Document 1) in which a pipe can be bent in a certain range with respect to another pipe when there are two pipes to be mounted together. A clamp device is also disclosed in Unexamined Utility Model Application Publication No. 05-063086 (Patent Document 2) in which an anchoring position for engaging a wire harness clamp portion with a car body mounting hole can be changed when the mounting position for the wire harness and the mounting hole in the car body are different. Also, a clamp device is disclosed in Unexamined Utility Model Application Publication No. 06-053879 (Registered Utility Model No. 2587328, Patent Document 3) in which a stud securing portion can be adjusted within a certain positional tolerance to accommodate transverse movement with respect to a pipe clamp when, at the securing position on the card body, there is transverse movement of the stud position with respect to the length of pipes.

The devices in Patent Documents 1 through 3 have a configuration allowing for accommodation when there is some discrepancy between a mounting position on a car body and a position where long components are arranged. The clamp device in Patent Document 1 is configured so that one pipe can be accommodated with respect to another pipe. However, the clamp device cannot be mounted directly on a car body, and curved pipes cannot be mounted on a car body. The clamp device in Patent Document 2 has a sliding mechanism between a mounting position on a car body and the mounting position of a wire harness, but the device cannot accommodate a position change when the mounting position on the car body and the position where the wire harness is arranged change. The sliding mechanism in the clamp device in Patent Document 2 does not provide enough fastening strength to keep the long components fastened to the car body. The clamp device in Patent Document 3 allows a stud mounting portion to move in a transverse direction with respect to a pipe clamp portion and lengthwise with respect to long components. However, it cannot provide sufficient stud position tolerance when all pipe clamp portions move with respect to stud mounting portions, and the mounting positions do not change when there is curvature in various pipes.

BRIEF DESCRIPTION OF THE INVENTION

An object of the present invention is to provide a clamp device for reliably mounting long components on a support even if the long components are curved or bent. For convenience of description, the invention will be described with regard to the mounting of pipes on car bodies, but it will be evident that the invention is applicable to the mounting of other long components, such as wire harnesses, for example, on other types of supports.

In one non-limiting embodiment, the present invention is a clamp device for fastening long components such as pipes on a support such as a car body, wherein the clamp device comprises a first clamp to be mounted on the support and a second clamp for holding long components. The first clamp comprises a first body having a first recess for receiving the second clamp and a first cover connected to the first body for holding the second clamp in the first recess. The second clamp comprises a second body having at least one second recess for receiving a pipe and a second cover connected to the second body to enclosed a pipe received in a second recess. The first recess provides space allowing the second clamp to move in a direction transverse to the length of pipes. The first cover and the second cover have cooperable movement restricting elements to restrict transverse movement of the second clamp in the first recess.

In this configuration, the first clamp is reliably secured to a support such as a car body, long components such as pipes are reliably supported by the second clamp, and transverse movement is possible within the first clamp. As a result, curvature of long components can be accommodated, and the long components can be securely mounted on the support despite the curvature.

In the clamp device, the movement restricting elements preferably include a plurality of grooves on one of the first cover and the second cover and a protrusion on the other cover for engaging one of the grooves. The protrusion and the grooves engage one another elastically. This allows for movement and transverse positioning of the second clamp with respect to the first clamp, and the proper selection of the position for pipe mounting. In addition, a holder is preferably provided in the first clamp to hold long components.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
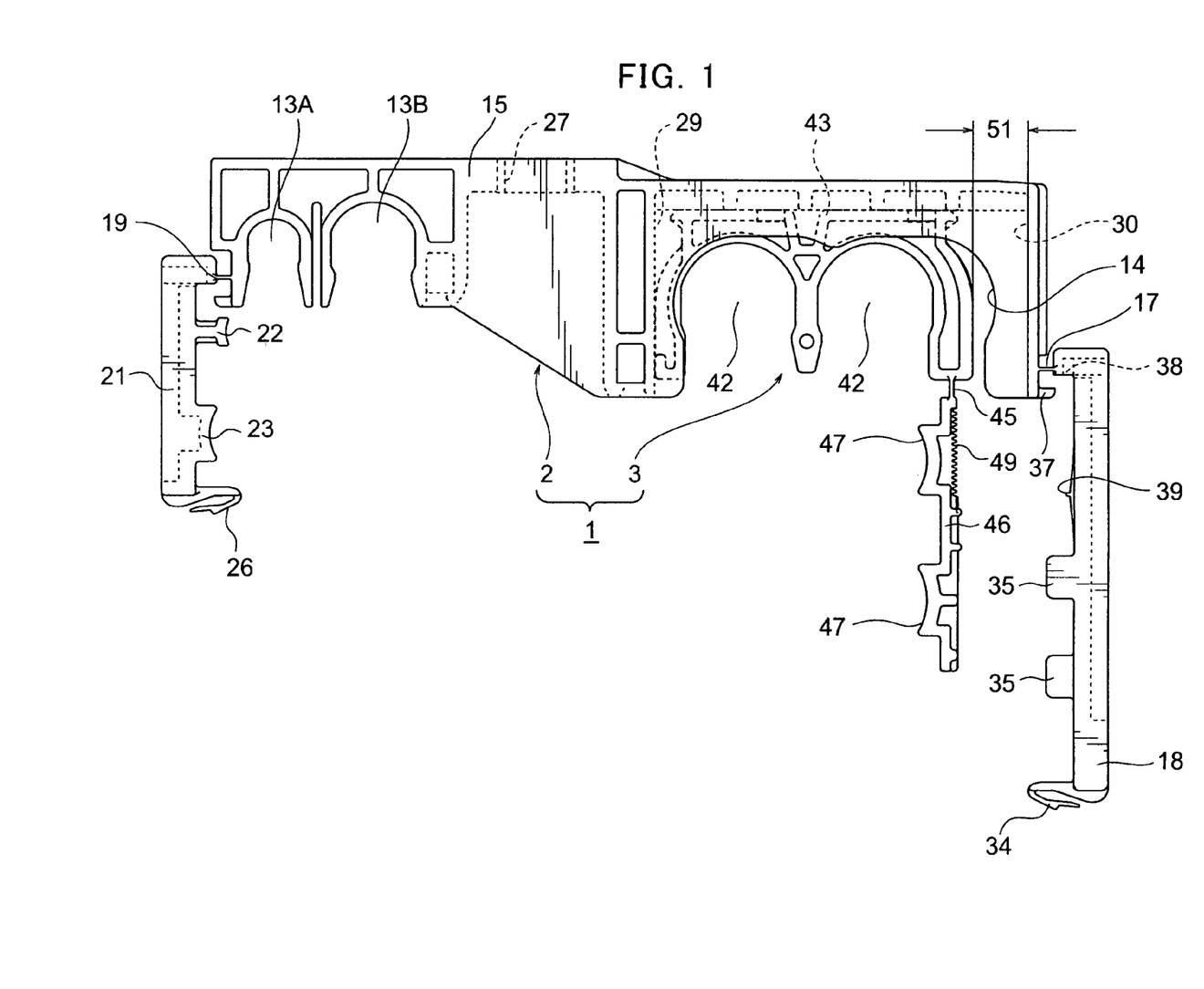
FIG. 1 is a front view of a clamp device in an embodiment of the present invention.
Figure 2:
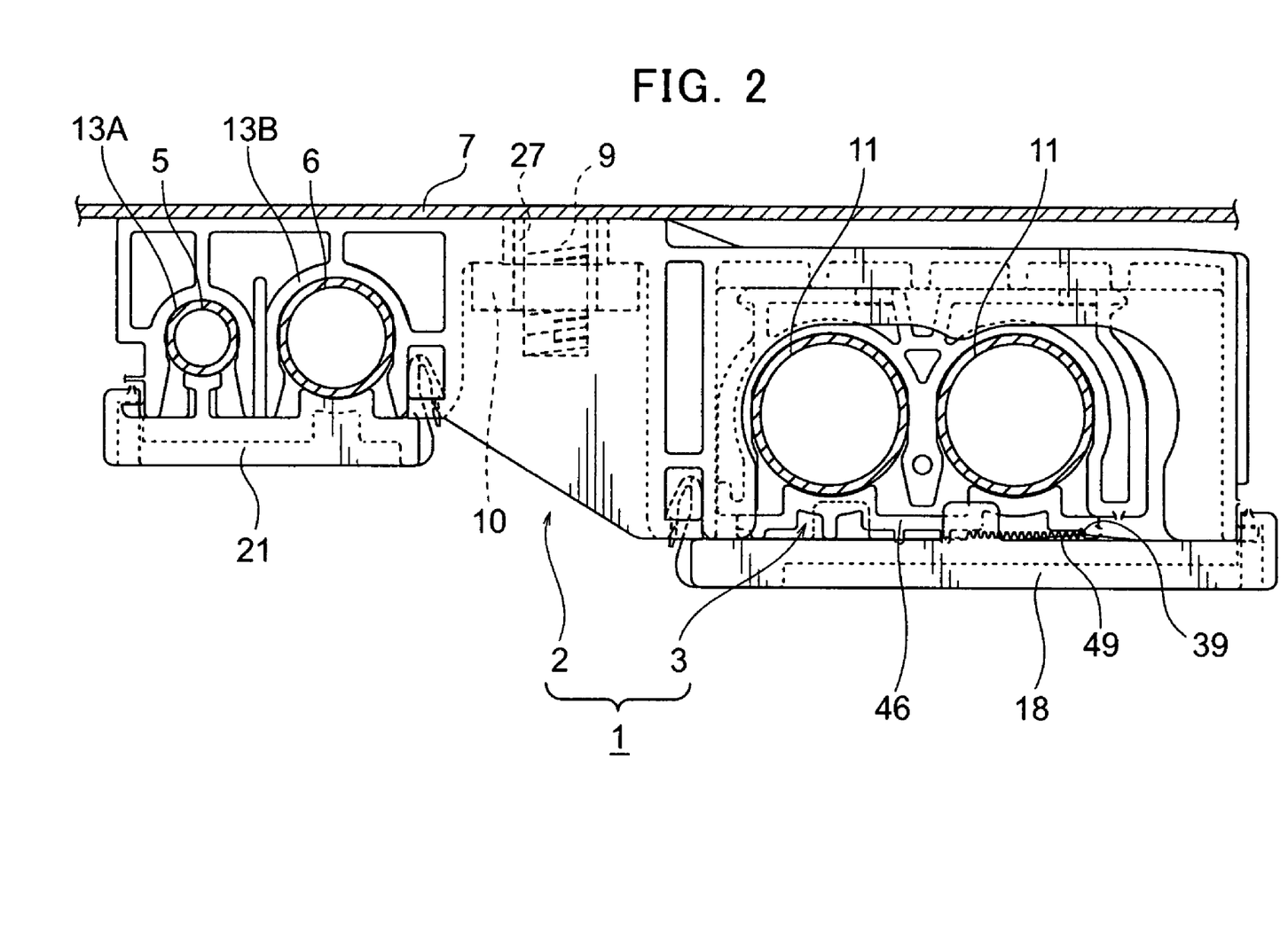
FIG. 2 is a partly cross-sectional view showing pipes mounted on a car body using the clamp device in FIG. 1.
Figure 3:
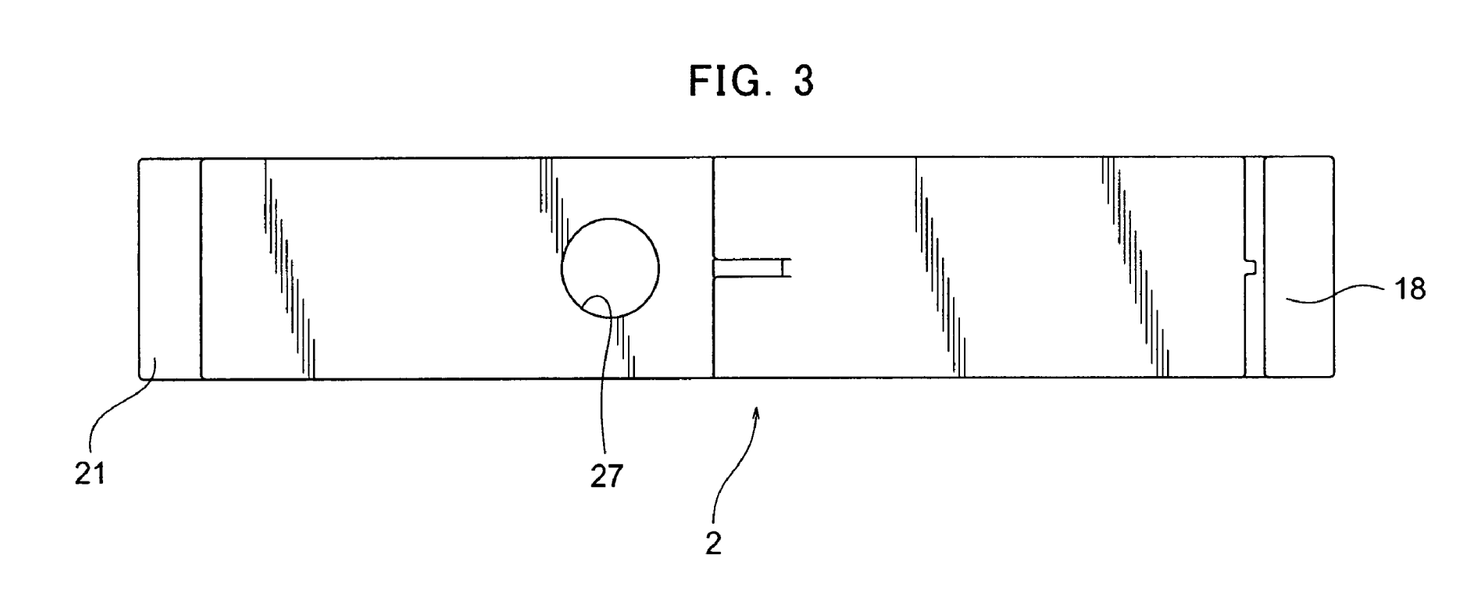
FIG. 3 is a plan view of a first clamp in the clamp device in FIG. 1.

A non-limiting embodiment of the present invention will now be explained with reference to the drawings. As shown in FIG. 1 and FIG. 2, in the present invention the clamp device 1 for components such as pipes comprises a first clamp 2 and a second clamp 3, preferably forming an integrated plastic product. The first clamp 2 is secured to a support such as the underfloor of an automobile using a stud bolt or normal bolt. The second clamp 3 holds at least one long component such as a heater pipe, brake fluid pipe or wire harness, and is itself held by the first clamp 2.

In one example shown in FIG. 2, the first clamp 2 holds a pipe 5 with a small diameter and a pipe 6 with a slightly larger diameter. The first clamp 2 is mounted on a car body 7 by a nut 10 screwed into a stud bolt 9 fixed to the car body 7. Large diameter pipes 11 such as heater pipes are held by the second clamp 3. The first clamp 2 will be explained below in detail with respect to FIG. 3 through FIG. 6, and the second clamp 3 will be explained below in detail with respect to FIG. 7 through FIG. 9.

The first clamp 2 has holders 13A and 13B for holding pipe 5 and pipe 6, and has a first body 15 adjacent to both holders in which a first recess 14 is formed to accommodate the second clamp 3. The first body 15 has a first cover 18 connected thereto by a hinge 17 for covering the second clamp 3 received in the first recess 14, and has a holder cover 21 connected by a hinge 19 to the first body 15 to keep the pipes held by holders 13A and 13B from falling out. Holder 13A has a recess for holding a small diameter pipe 5, and the holder cover 21 for holder 13A has a protrusion 22 for pressing down on the small diameter pipe in the holder 13A. Holder 13B has a recess for holding a medium diameter pipe 6, and the holder cover 21 has a protrusion 23 for pressing down on the medium diameter pipe 6 in the holder 13B. A lock pawl 26 is formed on the holder cover 21 to engage a lock hole 25 in the first body 15 and lock the held pipe in the first clamp 2. So that the first body 15 can be mounted on a support such as a car body, a bolt hole 27 can be formed in the bottom to accommodate a stud bolt 9.

The first recess 14 accommodates the second clamp 3 and is large enough to provide transverse space allowing the second clamp to move transversely. Side walls 29, 30 in the first body 15 prevent the second clamp 3 from moving transversely outside of the allowed space.

The transverse length of the space is selected so that curvature can be accommodated if long pipes formed within the acceptable tolerance have to be bent or curved between two mounting positions. End walls 31 in the first body 15 at the position of the first recess 14 prevent the second clamp 3 from moving lengthwise with respect to the pipes. A lock pawl 34 is formed in the first cover 18 to be inserted into a second lock hole 33 in the first body 15 and lock. This closes over and locks the second clamp 3 in the first recess 14. There preferably are walls 35 in the first cover 18 extending towards the first recess 14 in order to restrict movement of the second clamp 3 with respect to the pipes. Because the hinge 17 is a thin plate, hinge may become damaged when the cover 18 is closed. To prevent this, a protrusion 37 and a recess 38 are formed adjacent to the hinge 17. Upon closing the first cover 18, the protrusion 37 is inserted into the recess 38 and engaged to lock it.

Figure 4:
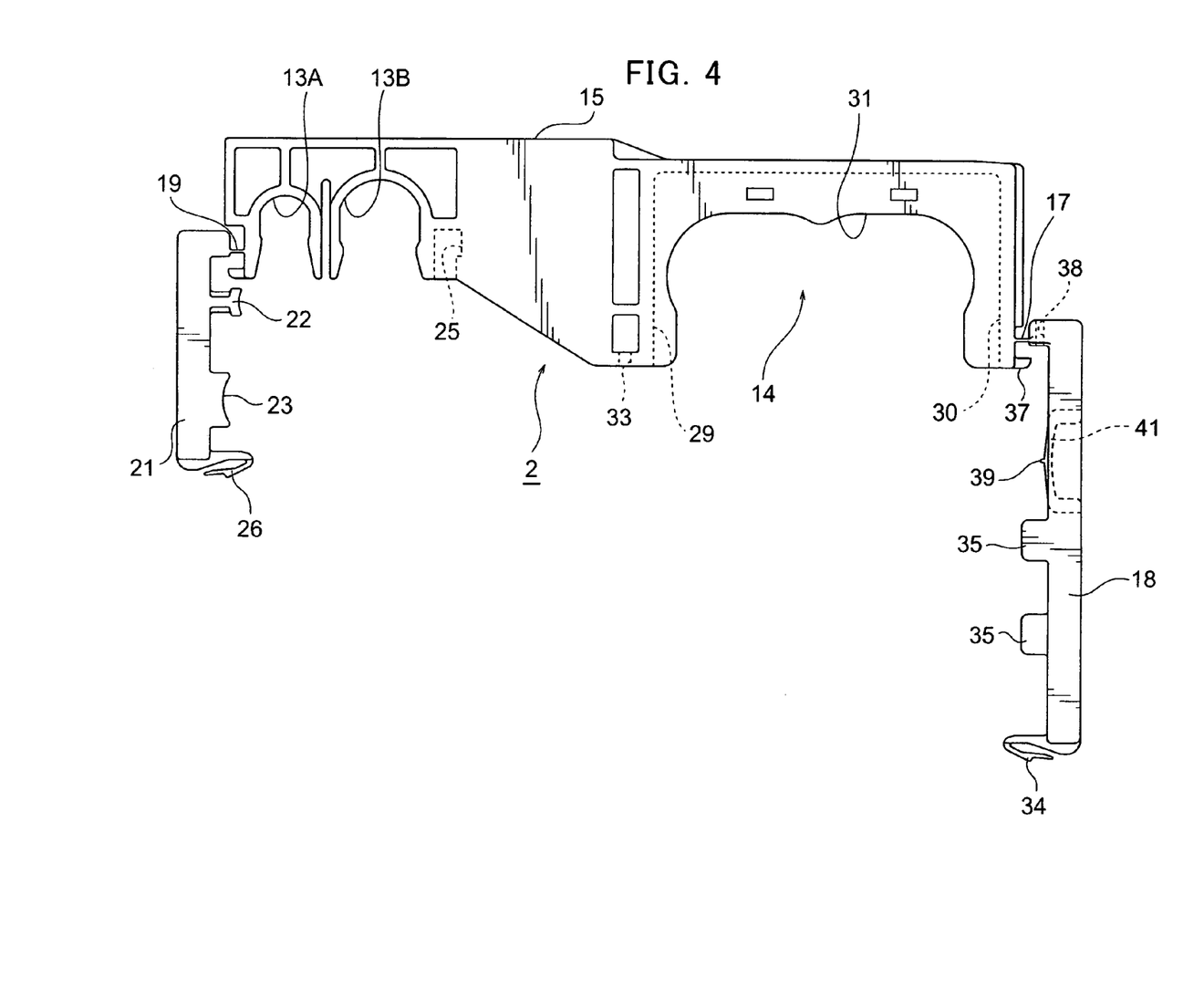
FIG. 4 is a front view of the first clamp in FIG. 3.
Figure 5:
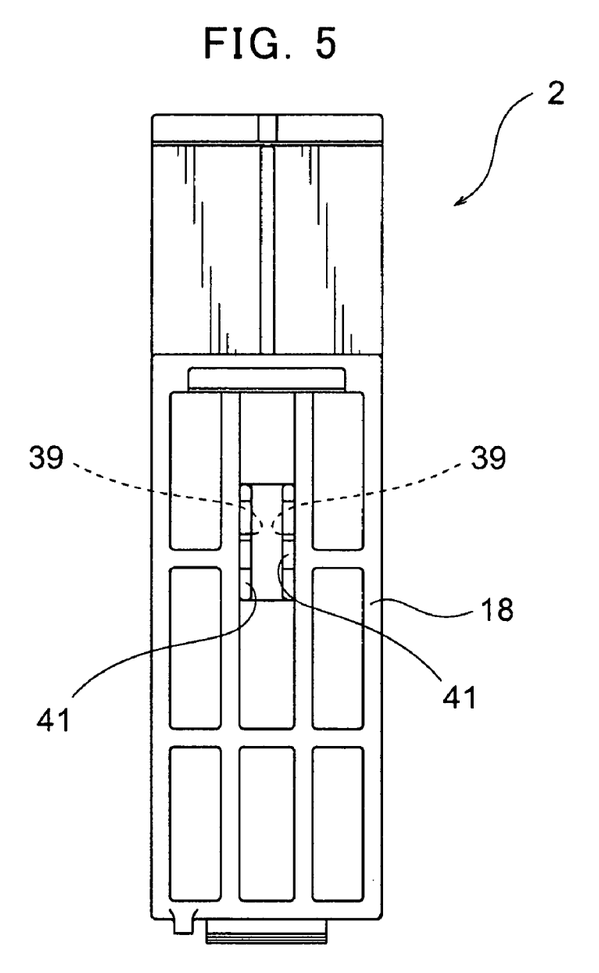
FIG. 5 is a view of the first clamp in FIG. 4 from the right side.
Figure 6:
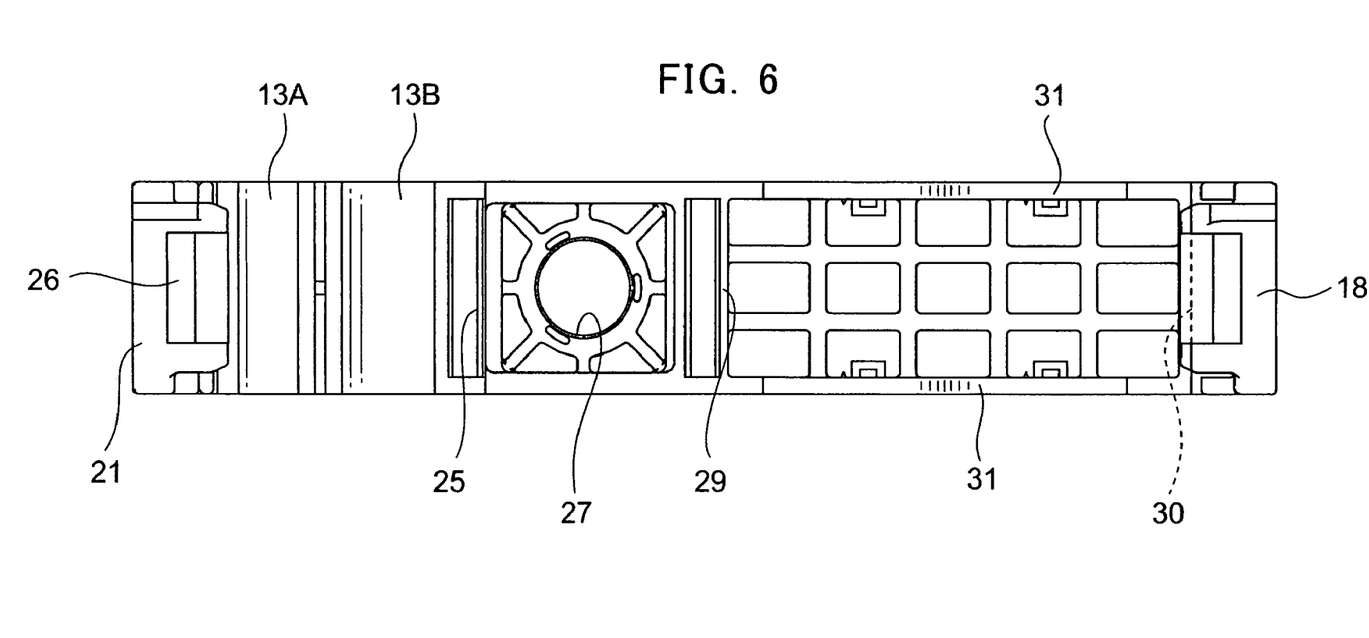
FIG. 6 is a view of the first clamp in FIG. 4 from the bottom.

As shown in FIG. 4, a protrusion 39 is formed on the first cover 18 as a restriction element for restricting the transverse movement of the second clamp inside the first recess 14 when cover 18 is closed. The protrusion 39 engages one of a series of grooves 49 on the second cover 46 (described below) situated on the second clamp 3. (This is another movement restricting element to restrict the transverse movement of the second clamp 3 inside the first recess 14.) This restricts the free movement of the second clamp 3 accommodated inside the first recess 14 in the transverse direction. The protrusion 39 in FIG. 4 is formed on the back side of the paper surface in FIG. 5 and, as shown by the dotted lines in FIG. 4 and the solid lines in FIG. 5, it is formed at the apex of a pair of elastic plates 41 extending from the main portion of the front cover 18 and engages a groove 49 on the second cover 46 of the second clamp 3 elastically.

Figure 7:
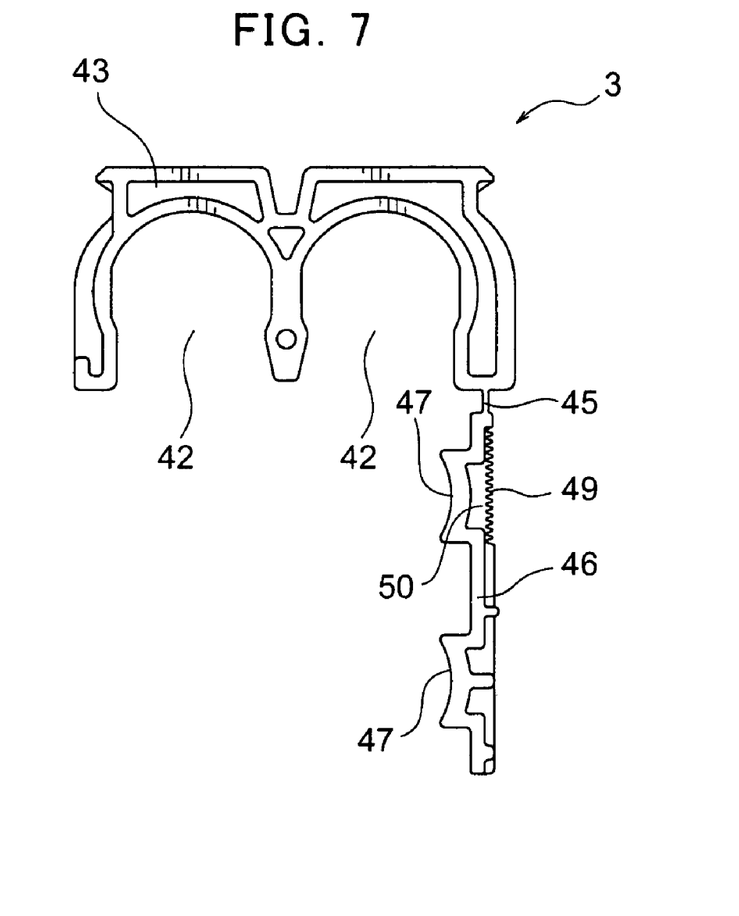
FIG. 7 is a front view of a second clamp in the clamp device in FIG. 1.
Figure 8:
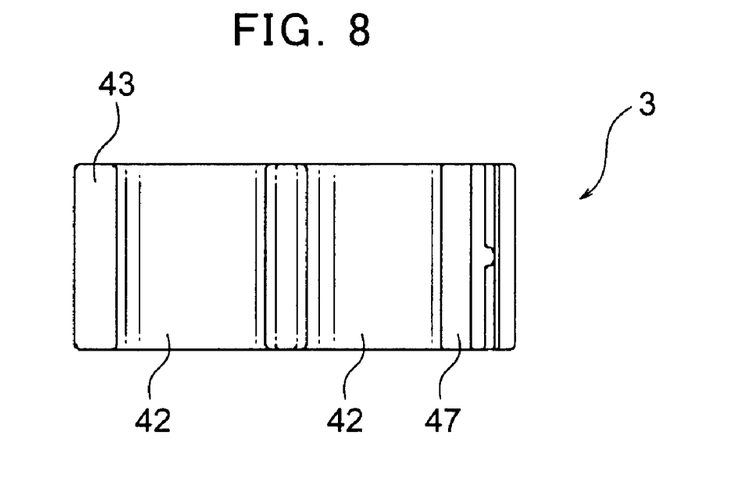
FIG. 8 is a view of the second clamp in FIG. 7 from the bottom.
Figure 9:
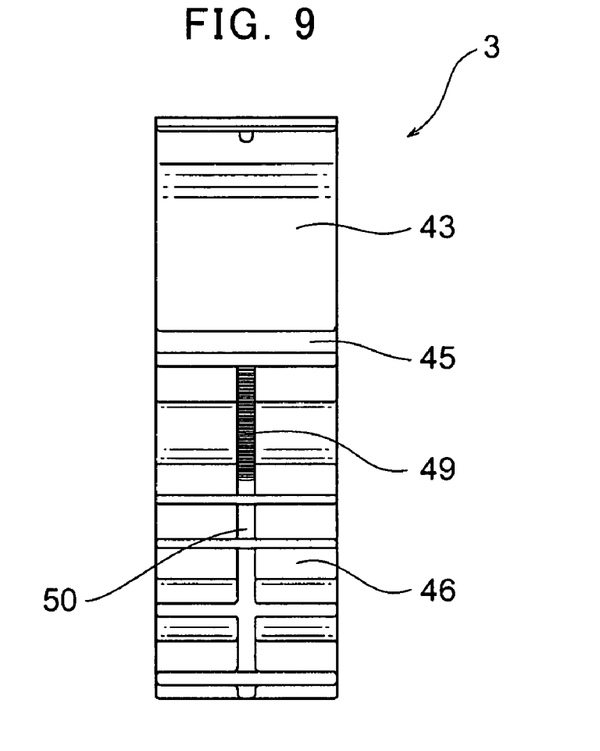
FIG. 9 is a view of the second clamp in FIG. 7 from the right side.

The configuration of the second clamp 3 will now be explained with reference to FIG. 7 through FIG. 9. The second clamp 3 includes a second body 43 in which two second recesses 42 accommodate two large diameter pipes 11 serving as long components, and a second cover 46 joined to the second body 43 by a hinge 45 to cover the pipes accommodated in the second recesses 42. The second clamp 3 is the right size to be accommodated by the first recess 14 in the first clamp 2, and of a predetermined length to allow for the formation of space enabling the movement of the pipes transversely inside the first recess 14 (that is, allowing for curvature of the pipes within a given tolerance). Opposing surfaces of the second body 43 and the first recess 14 have a shape allowing for transverse movement of the second body along the recess. The second recesses 42 are shaped so as to accommodate pipes. In the drawings, they have a semi-circular shape. Protrusions 47 are formed at positions corresponding to the pipes accommodated by the second recesses 42 to apply pressure and hold down the pipes accommodated by the second recesses 42 when cover 46 is closed.

A plurality of grooves 49 are formed on the second cover 46 at positions corresponding to the protrusion 39 on the first cover 18 transversely with respect to the pipes (or lengthwise with respect to the second cover 46) to serve as movement restricting elements to restrict the transverse movement of the second clamp 3 inside the first recess 14. As shown in FIG. 7 and FIG. 9, there are a plurality of grooves 49 in a rib 50 formed in the center of the second cover 46. The protrusion 39 supported elastically by the elastic plates 41 elastically engages one of the grooves 49. Although in this embodiment, the protrusion 39 is positioned elastically on the first cover and the grooves 49 on the second cover, the protrusion can be positioned elastically on the second cover and the grooves on the first cover. The protrusion can also be rigid where it is connected to the cover but elastic where it engages the grooves. Both the protrusion and the grooves can be wholly elastic. In this embodiment, there is a locking mechanism for the first cover 18 but not a locking mechanism for the second cover 46, which can have a locking mechanism if desired.

As indicated in FIG. 1, when the second clamp 3 is accommodated in the first recess 14 of the first clamp 2 and a pipe formed within the allowable tolerance is curved between two mounting locations, there is a length of free space 51 formed transversely to allow for the curvature. As stated earlier, in FIG. 2, the first clamp 2 has a holder 13A to accommodate a small diameter pipe 5 and a holder 13B to accommodate a medium diameter pipe 6. These are held directly by closing the holder cover 21. The first clamp 2 is mounted on a car body using a nut 10 screwed onto a stud bolt 9 fixed to the car body 7. In the second clamp 3, large diameter pipes 11 are accommodated in the second recesses 42 of the second clamp 3 and held by the second cover 46.

The second clamp 3 is accommodated in the first recess 14 of the first clamp 2 and held by the closed first cover 18. The protrusion 39 on the first cover 18 engages one of the plurality of grooves 49 formed in the second cover 46 to restrict the transverse movement of the second clamp 3 inside the first recess 14. Before locking the first cover 18, a curved pipe is accommodated by the second clamp 3 and supported. If the first cover 18 is locked in this state, the curved pipe is properly supported at this position without unreasonable stress. Fine adjustment is possible because any change in position can be accommodated by the pitch of the plurality of grooves 49.

While a preferred embodiment of the invention has been shown and described, changes can be made without departing from the principles and spirit of the invention, the scope of which is defined in the following claims.

What is claimed is:

1. A clamp device for mounting elongated components on a support, wherein the clamp device comprises a first clamp constructed for mounting on the support and a second clamp constructed for mounting on the first clamp, wherein the first clamp comprises a first body having a length transverse to at least one elongated component to be held by the clamp device, having a first recess for receiving the second clamp and having a first cover connected to the first body for holding the second clamp received in the first recess, wherein the second clamp comprises a second body having at least one second recess for receiving at least one elongated component and having a second cover connected to the second body for enclosing the at least one elongated component received in a second recess, wherein the first recess is dimensioned to provide a free space along the length of the first body and transverse to the length of the at least one elongated component, that allows the second clamp to move in the free space in a direction along the length of the first body and transverse to the length of the at least one elongated component, and wherein the first cover and the second cover have cooperable restricting elements to restrict movement of the second clamp in the transverse direction inside the free space in the first recess.

2. A clamp device according to claim 1, wherein the movement restricting elements include a plurality of grooves on one of the first cover and the second cover and a protrusion on the other cover disposed to engage one of the grooves.

3. A clamp device according to claim 2, wherein the protrusion and the grooves are constructed to engage each other elastically.

4. A clamp device according to claim 1, wherein the first clamp has a holder constructed to hold at least one elongated component.

* * * * *